FIG. I

INVENTORS
GEORGES FRAYSSE
GEORGES MIRAT
PAUL MIRAT
YVES PICHOFF
BY Bacon & Thomas
ATTORNEYS

United States Patent Office 3,187,217
Patented June 1, 1965

3,187,217
AMPLITUDE ANALYSING SPECTROMETER
Georges Fraysse, Ganshoren-Brussels, Belgium, Georges Mirat, Bourg-la-Reine, Paul Mirat, Antony, and Yves Pichoff, Bourg-la-Reine, France, assignors to Commissariat à l'Energie Atomique, Paris, France
Filed Oct. 19, 1960, Ser. No. 63,628
Claims priority, application France, Oct. 28, 1959, 808,739
5 Claims. (Cl. 315—12)

The exploitation of pulse spectra delivered by electronic apparatus often utilises analysers which select the pulses according to one of their characteristics. Generally, this characteristic is the amplitude.

Amplitude selectors known at present are of various kinds, which are usually classified according to the principle of their adding system.

In numerical adding selectors, the amplitude spectrum is divided into juxtaposed channels of equal breadth and each channel is followed by a recorder which totalises the number of pulses received and constitutes the memory.

These kinds of apparatus often have a dead time which varies as a function of the amplitude, since each pulse explores the channels one after the other. This disadvantage can be alleviated, for example, by making all the dead times of the same adequate length, but this constitutes a further disadvantage.

These selectors thus do not generally permit ready display of a region of the spectrum which it is desired to sub-divide or, on the contrary, in the case of monotone spectra and of low counting rates, a certain number of channels to be grouped together; it is also difficult without a new appropriate apparatus to render the spectrum visible in the course of an experiment with a view, for example, to making simultaneous adjustments or identification of a nuclear nature.

In photographic memory spectrographs, the pulses are produced and then applied to the vertical deflection plates of an oscilloscope, the screen of which is then photographed by means of a camera. The dead time is very small, but the phenomenon studied is not made visible and the consumption of photographic film is large; also, the necessity to develop the film introduces a supplementary delay and the scrutiny is very complex (photoelectric cells or photomultipliers) and of limited accuracy.

The "grey wedge" spectrograph described particularly in "Review of Scientific Instruments," June 1953 ("Gray-wedge pulse-height analysis," pages 437 to 444), makes use of an optical wedge constituted by a prism tinted in the mass, which is interposed between a photographic apparatus and the screen of an oscilloscope, the vertical deflection plates of which receive the pulses to be analysed and the horizontal deflection plates of which receive a linear sweep triggered by the arrival of each pulse.

The optical wedge can be replaced by an "electronic wedge" of a more flexible use.

This apparatus is simple, less cumbersome and gives very satisfactory results; also, the dead time is very small and independent of the pulse amplitude. Also, it is the spectrum itself which is obtained after development of the film.

But, when the film is developed, it is too late to adjust the controls and if, a priori, the appearance of the spectrum and the number of strokes to be counted are ignored, there is a considerable risk of having flat peaks or invisible minima, which necessitates repeating the experiment, if that is possible.

The present invention has the object of providing an amplitude analysing spectroscope which overcomes the above disadvantages.

This analysing spectroscope is essentially characterised in that it combines the electronic circuits of an electronic grey wedge spectrograph and an image-retaining cathode ray tube.

It is known that this type of tube includes a "memory screen" disposed between the system of deflection plates and the fluorescent screen and constituted by an extremely thin deposit of an appropriate dielectric on a very fine mesh metallic grid (for example 20 meshes per millimetre). This screen is subjected to a deviated electron beam.

The "memory screen," under the impact of a suitably accelerated electron beam, gives rise to an emission of secondary electrons with a co-efficient of multiplication greater than unity. If the "memory screen" initially has zero potential, the different points explored by the beam become charged positively because of the electronic emission. A relief of positive charges thus results, which can persist indefinitely if the dielectric is without loss.

A second or reading electron gun placed in the same envelope bombards the whole of the "memory screen" with a low electronic speed in an analogous manner. The electrons issuing from this reading gun pass through the "memory screen" at points where the charge is sufficiently positive but are repulsed otherwise.

On the fluorescent screen placed behind the screen, there is obtained, after post-acceleration, a relief image of the charges deposited on the "memory screen."

The writing of any information can thus be created, in the form of a relief image of charges on the memory screen, and reading can be effected at any moment by simple irradiation of this screen with a low energy electronic beam. To "clear" the memory screen, it is sufficient to discharge the small elementary condensers which constitute it by connecting the metallic grid to a suitable potential. This operation generally lasts several seconds. Various kinds of image-retaining tube have been developed, but the same memory principle holds good for all.

In accordance with the invention, the same sweeping principle is used as in a grey wedge spectrometer. The pulses to be analysed pass into a circuit which does not affect their amplitude, but which calibrates their durations to a predetermined value.

Each of these pulses produced is applied to the horizontal deflection plates, while at the same instant a signal (exponential or logarithmic, for example), which is independent of the amplitude of the pulse to be analysed, is applied to the vertical deflection plates.

The resulting information is recorded on the memory screen as a relief of charges decreasing to zero and as a measure of the instantaneous speed of the sweeping operation.

The electronic reading beam permits observation on the screen of a brilliant trace which shades off step by step towards the upper part of the screen.

If a new signal strictly identical with the preceding one is written on the memory screen the corresponding brilliant trace on the screen is slightly elongated upwardly as the new charge applied becomes added to the existing charges.

It will be seen that the size of the "channels" is aproximately represented by the size of the spot. It is thus possible readily to represent the equivalent of several hundreds of channels. It may be mentioned that it is possible to reduce this number to any value in the case of analysis at low counting rates, for example, by defocussing the writting spot.

Also, it is possible to modify the capacity of the various "channels," that is to say, their maximum number of recorded strokes, either by varying the speed of sweeping or by modifying the intensity of the writing beam by action on the Wehnelt or central electrode or any other suitable means.

The dead time is equal to the total time of one sweep. This cannot be reduced idefinnitely, because the time of transit of the electrons through the deflection plates does not remain negligible. One can obtain a dead time of the order of 5 micro-seconds.

However, this dead time can be still further reduced to a value much lower than one micro-second, by using relaxed sweeping, a method which has already been used in certain grey-wedge spectrographs and is described particularly by Muzdekr in the "Bulletin des Instruments," "Boris Kidrich," No. 3, page 75 (1953).

The difference between this method and that which has already been described consists in replacing the sweeping signals applied to horizontal deflection plates by low frequency relaxed signals.

To do this, the Wehnelt or control electrode of the writing gun is adjusted to have a cut-off rest state (that is to say, to effect complete blockage of the beam). Each pulse to be analyzed releases a very short pulse which unblocks the Wehnelt or control electrode; also, all pulses of the same amplitude are represented on the screen by a series of points aligned on the same vertical defining a "channel" and the number of points is higher when the speed of sweeping is lower.

The spectrum read on the screen is the locus of points of constant density; consequently, according to whether an exponential or logarithmic sweeping law is adopted, a linear or logarithmic spectrum is obtained, when the number of points registered per unit time is proportional to the variation of the ordinate with respect to time.

The spectra thus obtained are very well contrasted, because, on the one hand, each point of the memory screen of the image-retaining tube becomes charged, for a constant intensity incident beam, according to a linear law as a function of the time up to a certain equilibrium maximum and, on the other hand, the memory screen of the image-retaining tube offers to the electrons issuing from the reading gun either a substantially infinite or zero permeability (on or off action).

With reference to the accompanying diagrammatic FIGURES 1 to 3, an embodiment is described below, by way of example only, of an amplitude analysing spectroscope in accordance with the invention. The various devices which are described in relation to this embodiment are to be considered as forming part of the invention, it being understood that all equivalent devices can also be used without departing from the scope thereof.

Figure 1:
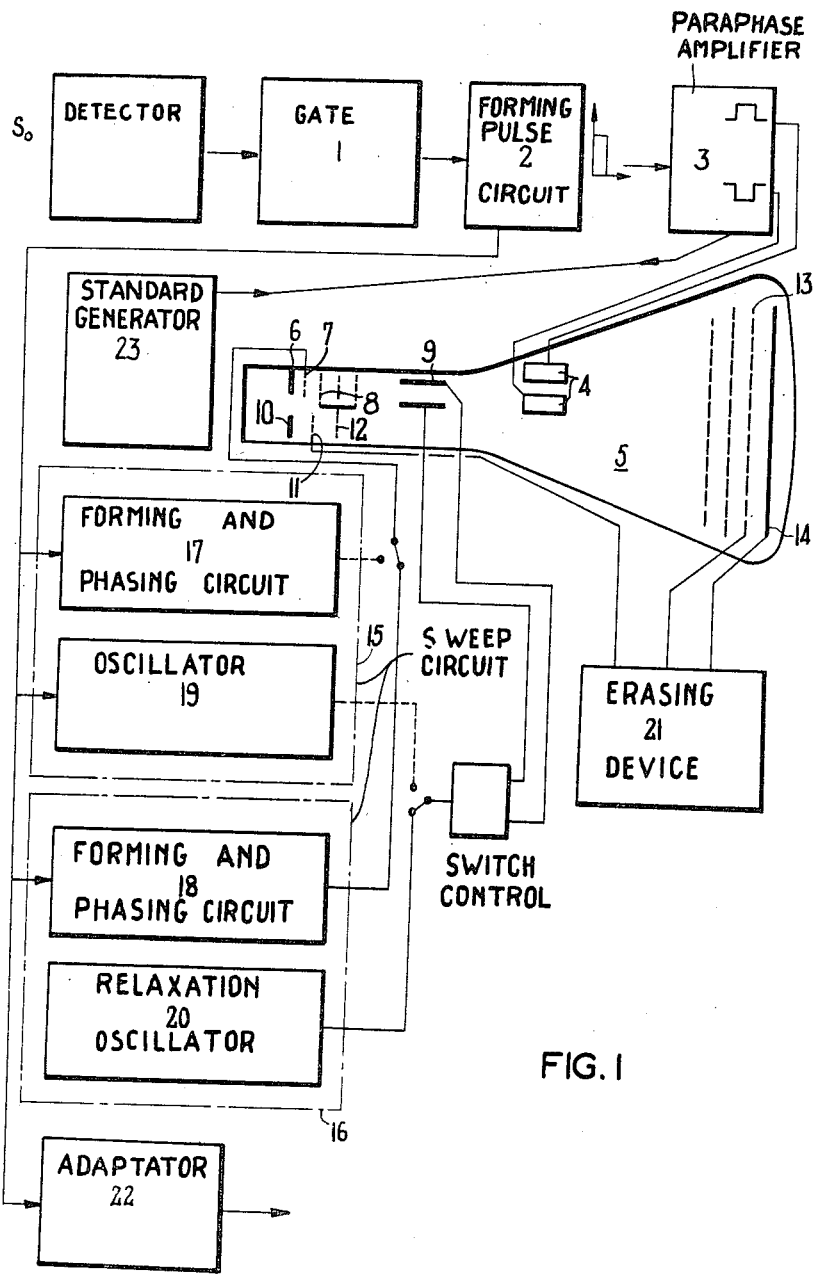
FIG. 1 is a block diagram of a spectroscope assembly according to the invention, applied to the study of a radioactive source.

As shown in FIG. 1, a radioactive source SO (for example, caesium 137) is placed in front of a detector D followed by an electronic gate 1 having an input threshold and a circuit 2 for forming pulses.

These pulses are applied, by way of a paraphase amplifier device 3, to the horizontal deflection plates 4 of an oscilloscope tube 5.

This tube 5 includes two distinct electron/optical systems: on the one hand, that of a standard oscilloscope, namely, a cathode 6, a Wehnelt or control electrode 7, anodes 8, vertical deflection plates 9 and the aforesaid horizontal deflection plates 4 and, on the other hand, that of an image-retaining tube, namely, a cathode 10, a Wehnelt or control electrode 11, an anode 12, a memory grating 13 and a fluorescent screen 14.

Two sweep devices 15 and 16, each comprising a circuit 17 or 18 for forming and phasing the Wehnelt or control signal and a triggered sweep signal generator 19 or relaxation sweep signal generator 20, allow the desired spectroscopy to be effected.

The assembly is completed by a writing, reading and erasing device 21 for the memory screen 13, as well as an outlet 22 for the use, in appropriate cases, of an electromechanical countscaler and a subdividing generator 23 for subsequent sub-division.

Figure 2:
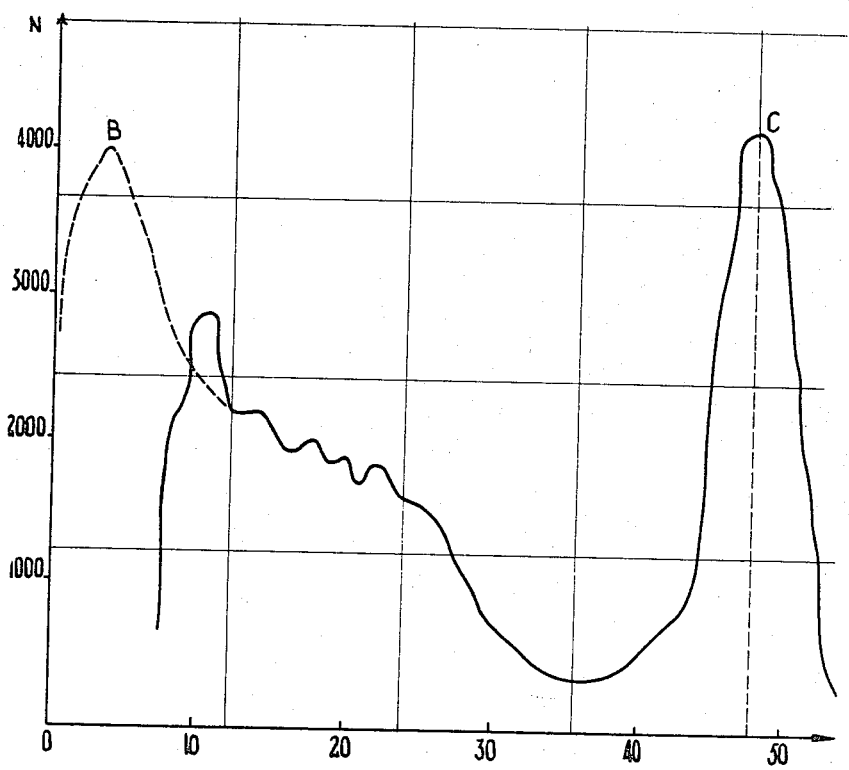
FIG. 2 represents the spectrum of such a source obtained by means of a standard electro-mechanical selector.

In FIG. 2 is shown the spectrum of caesium 137 obtained by means of a standard electromechanical selector using a 100-channel selector; the ordinates give the number of strokes and the absciassae give the energy of the particles in volts (for a gain of 3,000). At B, the peak of a X-radiation of barium (0.032 mev.) can be seen and, at C, the peak of caesium (0.663 mev.).

Figure 3:
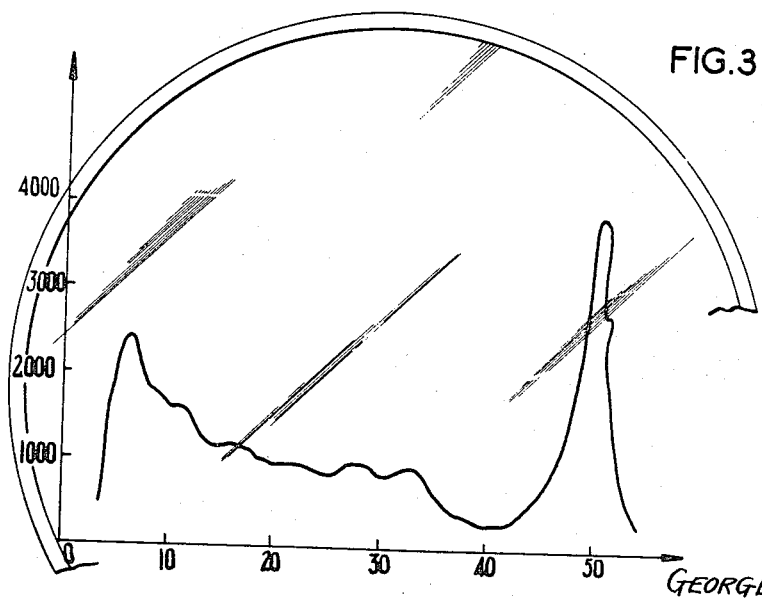
FIG. 3 represents the spectrum of the same source obtained by means of a spectroscope according to the invention.

FIG. 3 represents the spectrum of the same source as that which was used to obtain the spectrum shown in FIG. 2, but obtained with the aid of a spectroscope in accordance with the invention (relaxed sweeping). It is important to emphasise that this spectroscope allows contrasted spectra to be obtained with a greater clarity than those which have been obtained by a known electronic selector; the clarity of the spectrum shown in FIG. 3 may may be mentioned, in the region of the peaks and minima, on which subsequent calculations are based.

In FIG. 3, the ordinates shown the number of strokes and the absciassae show the energy of the particles in volts.

We claim:
1. An amplitude analysing spectrometer, comprising a cathode tube with fluroescent screen, a first pair of deflection plates connected to a means for delivering for each signal to be analysed a first difference of potential of value proportional to the amplitude of the signal and of constant duration, a second pair deflection plates connected to a sweeping means for delivering a difference of potential of predetermined form released simultaneously with the start of the first difference of potential and with the beginning of an impulse produced by a generator of an unblocking signal to a Wehnelt control electrode of the tube, the spectrometer having a memory electrode disposed between the screen and the deflection system of the cathode beam, said memory electrode being capable of locally accumulating charges due to successive passages of the beam following a plurality of releases and of presenting, with the beam being blocked, as relief image of charges as a function of the locally accumulating charges, a reading electron gun being provided in said tube to bombard the said memory electrode, after the reception of a plurality of signals to be analyzed, to display the accumulated charges on the screen.

2. A spectroscope according to claim 1, in which the sweeping applied to the first, vertical, deflection plates is an exponential signal released by each pulse to be analysed.

3. A spectroscope according to claim 1, in which the sweeping applied to the first, vertical, deflection plates is a relaxed, low frequently signal of exponential form.

4. A spectroscope according to claim 1, in which the sweeping applied to the first, vertical, deflection plates is a relaxed low frequency signal of logarithmic form.

5. A spectroscope according to claim 1, in which the memory screen of the image-returning tube offers to the electrons of the reading gun a permeability function, of the accumulated charge, and which is either practically total or practically nothing, following the importance of the relief of charge to the point considered by the electrode memory.

References Cited by the Examiner

UNITED STATES PATENTS 2,745,985  5/56  Lewis _____ 315—12 XR
2,778,494  1/57  Borkowski et al. _____ 250—83.3
2,965,757  12/60 Martin et al. _____ 250—83.3

DAVID G. REDINBAUGH, *Primary Examiner.*

RALPH G. NILSON, *Examiner.*